US010282738B2

(12) United States Patent
Freeman (10) Patent No.: US 10,282,738 B2
(45) Date of Patent: May 7, 2019

(54) SYSTEM AND METHOD FOR LOCATION-BASED COPAY CARD REDEMPTION MANAGEMENT (71) Applicant: IMS HEALTH INCORPORATED, Danbury, CT (US)

(72) Inventor: Jesica Freeman, Yardley, PA (US)

(73) Assignee: IQVIA INC., Parsippany, NJ (US)

( * ) Notice: Subject to any disclaimer, the term of this patent is extended or adjusted under 35 U.S.C. 154(b) by 815 days.

(21) Appl. No.: 14/248,802

(22) Filed: Apr. 9, 2014

(65) Prior Publication Data
US 2014/0310063 A1 Oct. 16, 2014

Related U.S. Application Data (60) Provisional application No. 61/810,332, filed on Apr. 10, 2013.

(51) Int. Cl.
G06Q 30/00 (2012.01)
G06Q 10/00 (2012.01)
G06Q 30/02 (2012.01)

(52) U.S. Cl.
CPC ..... *G06Q 30/0205* (2013.01); *G06Q 30/0214* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| 5,612,527 | A  | * | 3/1997  | Ovadia   | G06Q 20/201  |
|           |    |   |         |          | 235/375      |
| 5,845,255 | A  | * | 12/1998 | Mayaud   | G06F 19/3456 |
|           |    |   |         |          | 705/3        |
| 6,029,141 | A  | * | 2/2000  | Bezos    | G06Q 20/0855 |
|           |    |   |         |          | 705/26.41    |
| 6,119,933 | A  | * | 9/2000  | Wong     | G06Q 20/14   |
|           |    |   |         |          | 235/380      |
| 6,185,541 | B1 | * | 2/2001  | Scroggie | G06Q 20/12   |
|           |    |   |         |          | 705/14.23    |
| 6,618,504 | B1 | * | 9/2003  | Yoshino  | G06K 9/00449 |
|           |    |   |         |          | 382/187      |
| 6,654,724 | B1 | * | 11/2003 | Rubin    | G06F 19/322  |
|           |    |   |         |          | 705/2        |
| 7,058,584 | B2 | * | 6/2006  | Kosinski | G06F 19/3418 |
|           |    |   |         |          | 379/106.02   |

(Continued)

Primary Examiner — Alan S Miller
(74) Attorney, Agent, or Firm — John Maldjian; Maldjian Law Group LLC (57) ABSTRACT The present disclosure provides a system and a method for location-based copay card redemption management. In one example, the method includes receiving a redemption measure representing a rate of redeemed copay cards originating from each referral source of a plurality of referral sources, receiving location information of a user device, determining a geographic area of the user device in view of the location information, determining a set of referral sources from the plurality of referral sources based on respective redemption measures and based on the geographic area of the user device, wherein an address associated with each referral source in the set of referral sources is located within the geographic area of the user device, and transmitting, to the user device, the address associated with each referral source in the set of referral sources.

22 Claims, 7 Drawing Sheets

(56) References Cited

U.S. PATENT DOCUMENTS

| | | | | |
|---|---|---|---|---|
| 7,589,628 B1* | 9/2009 | Brady, Jr. | G01C 21/20 | 340/10.1 |
| 7,613,620 B2* | 11/2009 | Salwan | G06F 19/322 | 600/300 |
| 7,895,177 B2* | 2/2011 | Wu | G06Q 30/02 | 707/706 |
| 8,015,028 B2* | 9/2011 | Summers | G06F 19/327 | 600/300 |
| 8,032,398 B1* | 10/2011 | Kelly | G06F 19/3431 | 600/300 |
| 8,332,237 B2* | 12/2012 | Greenman | G06F 19/3456 | 705/3 |
| 8,341,015 B2* | 12/2012 | Harrell | G06Q 10/101 | 705/14.11 |
| 8,370,190 B1* | 2/2013 | Larson | G06Q 30/0202 | 705/7.32 |
| 8,386,276 B1* | 2/2013 | Liu | G06F 19/00 | 705/2 |
| 8,533,004 B1* | 9/2013 | Grady | G06Q 50/22 | 705/2 |
| 8,812,345 B2* | 8/2014 | Cragun | G06Q 30/02 | 705/7.31 |
| 2001/0051920 A1* | 12/2001 | Joao | G06Q 20/04 | 705/41 |
| 2002/0026329 A1* | 2/2002 | Saito | G06F 19/325 | 705/3 |
| 2002/0133386 A1* | 9/2002 | Chishti | G06Q 10/10 | 705/7.29 |
| 2002/0165736 A1* | 11/2002 | Tolle | G06F 19/328 | 705/3 |
| 2003/0009367 A1* | 1/2003 | Morrison | G06F 19/326 | 705/7.33 |
| 2003/0050799 A1* | 3/2003 | Jay | G06F 19/322 | 705/2 |
| 2003/0078788 A1* | 4/2003 | Sussman | G06Q 30/02 | 705/1.1 |
| 2004/0236607 A1* | 11/2004 | Kost | G06Q 10/10 | 705/2 |
| 2005/0033653 A1* | 2/2005 | Eisenberg | G06Q 20/12 | 705/26.8 |
| 2005/0187822 A1* | 8/2005 | Lapsker | G06Q 30/0221 | 705/14.22 |
| 2006/0229932 A1* | 10/2006 | Zollo | G06Q 30/02 | 705/26.7 |
| 2007/0024436 A1* | 2/2007 | Bandy | G06K 17/0022 | 340/505 |
| 2007/0129967 A1* | 6/2007 | Thompson | G06F 19/3443 | 705/2 |
| 2007/0179831 A1* | 8/2007 | Patnaik | G06Q 10/0631 | 705/7.16 |
| 2007/0239484 A1* | 10/2007 | Arond | G06Q 10/0637 | 705/2 |
| 2007/0282650 A1* | 12/2007 | Jackness | G06Q 10/06375 | 705/7.42 |
| 2008/0262928 A1* | 10/2008 | Michaelis | G06Q 30/02 | 705/14.26 |
| 2008/0288281 A1* | 11/2008 | Shell | G06Q 10/10 | 705/2 |
| 2009/0063188 A1* | 3/2009 | Schoenberg | G06Q 10/06375 | 705/2 |
| 2009/0132287 A1* | 5/2009 | Spivey | G06F 19/3425 | 705/3 |
| 2009/0177523 A1* | 7/2009 | Routtenberg | G06F 17/30241 | 705/7.34 |
| 2009/0192876 A1* | 7/2009 | De | G06Q 30/02 | 705/7.33 |
| 2009/0204430 A1* | 8/2009 | Gliklich | G06F 19/327 | 705/2 |
| 2009/0222284 A1* | 9/2009 | McEachern | G06Q 30/02 | 705/2 |
| 2009/0254366 A1* | 10/2009 | Jacobs | G06F 19/328 | 705/2 |
| 2011/0079643 A1* | 4/2011 | Pourfallah | G06Q 30/06 | 235/380 |
| 2011/0093349 A1* | 4/2011 | Drescher | G06Q 30/00 | 705/14.73 |
| 2011/0099048 A1* | 4/2011 | Weiss | G06Q 10/00 | 705/7.34 |
| 2011/0106721 A1* | 5/2011 | Nickerson | G06Q 30/02 | 705/347 |
| 2011/0246258 A1* | 10/2011 | Cragun | G06Q 30/02 | 705/7.31 |
| 2011/0276357 A1* | 11/2011 | Patnaik | G06Q 10/0631 | 705/7.13 |
| 2011/0313828 A1* | 12/2011 | Harrell | G06Q 10/101 | 705/14.13 |
| 2012/0173287 A1* | 7/2012 | Cowand | G06Q 10/087 | 705/3 |
| 2014/0214435 A1* | 7/2014 | Previdi | G06Q 50/22 | 705/2 |

* cited by examiner

SYSTEM AND METHOD FOR LOCATION-BASED COPAY CARD REDEMPTION MANAGEMENT

RELATED APPLICATIONS

The present application claims the benefit of U.S. Provisional Application Ser. No. 61/810,332, titled "System and Method for Location-Based Copay Card Redemption Management," filed on Apr. 10, 2013, the entire contents of which are herein incorporated by reference.

FIELD OF THE INVENTION

The present disclosure is directed to location-based copay card or voucher redemption management. More particularly, the present disclosure is directed to enabling computing devices, such as tablets and smart phones, to display copay card or voucher activity of certain entities (e.g., physicians and pharmacies), based on a location of the device.

BACKGROUND

Currently, pharmaceutical companies issue prescription drug coupons, vouchers, or copay cards direct to health care professionals (HCP) or physicians (Point of Care), pharmacies (Point of Sale), or traditional and nontraditional Direct to Consumer (DTC) channel marketing mix (including print, TV, radio, patient starter kits, sample with a copay card or voucher attached, branded websites, unbranded websites, Quick Response codes (QR codes), SMS Text, Mobile Coupons, ePrescribing, Mobile Wallets, Email PDF attachments) with the intent to help reduce the out-of-pocket expense to patients and promote compliance and persistency on the course of therapy using copay cards or vouchers on certain pharmaceutical drugs. It should be noted that copay cards or vouchers can be used one time or can be used multiple times for ongoing out-of-pocket savings to a patient. The physicians or pharmacies distribute the copay cards or vouchers directly to the consumers or patients. When the consumer or patient receives the copay card or voucher from the physician, pharmacy, or DTC marketing campaign, the consumer can redeem the copay card or voucher at a pharmacy with a valid written prescription from the patient's physician to reduce the out-out-of pocket price of the pharmaceutical drug. The copay card or voucher can be a secondary claim at the pharmacy management system and the pharmacy processing fees and payment of the secondary claim can be handled by an established adjudicator partnership that deploys the copay card or voucher marketing programs on behalf of their clients.

Pharmaceutical brand marketing program information have been traditionally delivered to field sales force personnel by way of a spreadsheet, such as Microsoft® Excel, via e-mail or via an online portal. Marketing program information delivered within the spreadsheets can be filtered by members of the field sales force to generate an optimized customer targeting strategy for their territory. With mobility technology advances, members of the field sales force have been outfitted with tablet computers, such as Apple® iPads, to engage with their key stakeholders (e.g., their important physicians or pharmacies).

However, there is a lack of an ability to deliver the information related to such activities to the field sales force to enable real-time updates and analysis to improve sales coverage.

SUMMARY

The present disclosure relates to a system and method for location-based voucher or copay card redemption management. Each copay card or voucher can have a unique identifier that indicates, among other items of information, the name and addresses of the respective physician and pharmacy that was involved with the processing of a particular voucher or copay card. The system and method can capture the information during the redemption of the copay card or voucher by the patient or consumer. Each copay card or voucher can have a unique group number which indicates the marketing channel that the copay card or voucher had been distributed to. Components of the marketing channel include, but are not limited to, the patient, physician, pharmacy, and Direct to Consumer (DTC) marketing campaigns. When the copay card or voucher is redeemed by the patient or consumer, the system and method can obtain information such as the name and address of the physician who wrote the prescription and the name and pharmacy address where the copay card or voucher was redeemed and can enter such information into a database. The database can indicate the number of copay cards or vouchers that were redeemed by a certain physician or pharmacy. The database can also associate one or more addresses with the physician or pharmacy (independent, specialty, and retail pharmacies).

The database containing the copay card or voucher information can be accessed by a device (e.g., a laptop computer, a tablet, a smart phone, and the like) order to identify the highest and/or lowest performing physicians or pharmacies in a certain region or territory based on certain criteria such as copay card or voucher redemption. The copay card or voucher information and the addresses of the physicians and pharmacies in the region can be transmitted to the device. When the device enters a location within the region, the global positioning system (GPS) coordinates of the address of the physician or pharmacy can be used in conjunction with a device that is equipped with GPS capability. The transmitted copay card or voucher information relating to the highest and/or lowest performing physicians or pharmacies (e.g., those having the highest and/or lowest copay card or voucher redemption activity) can be displayed by the device when the device is within the range or vicinity of the address of the—physicians or pharmacies.

BRIEF DESCRIPTION OF THE DRAWINGS

The present disclosure will be more readily understood from the detailed description of exemplary embodiments presented below considered in conjunction with the attached drawings, of which.

It is to be understood that the attached drawings are for purposes of illustrating the concepts of the invention.

DETAILED DESCRIPTION

Systems and methods for location-based copay card or voucher redemption management are described. A copay card or voucher can have unique identifiers that indicate, among other items, the name and addresses of the physician, the pharmacy and the copay card or voucher distribution marketing channel. Such information can identify how the patient received the copay card or voucher by either the physician, pharmacy, or Direct to Consumer (DTC) marketing campaign. When the copay card or voucher is redeemed by the patient or the consumer, the name and the address of the physician who wrote the prescription and the pharmacy name and address where the copay card or voucher was redeemed by the patient can be entered into a database. The database can indicate the total amount of copay cards or vouchers that were redeemed by a certain physician or pharmacy and track the redemption distribution activity or rate thru various marketing channels. The total amount of redeemed copay cards or vouchers can be reflective of an identified periodic time period (e.g., month-to-date, quarter-to-date, year-to-date, or the like), or it can be reflective of the cumulative total to date. The system can associate each physician and pharmacy with an address.

The database containing the copay card or voucher information can be used in conjunction with a mapping application for converting the address of the each physician or pharmacy to a global positioning system (GPS) latitude/longitude coordinate point on the Earth. The GPS coordinate point of the address of the physician and pharmacy can be used in conjunction with a user device equipped with GPS capability.

The system can receive location information of a user device, can convert the location information to a GPS point, and determine a geographic area of the user device in view of the location information. The system can determine a set of top and bottom performing physicians or pharmacies within the determined geographic area based on the copay card or voucher data and transmit the addresses associated with each of the top and bottom performing physicians or pharmacies to the user device. In an embodiment, the pharmaceutical sales force can be informed on a real-time basis of the top and bottom performing physicians or pharmacies so that the sales force can visit them based on the latest information.

In an embodiment, digital copay cards or vouchers (e.g., a PDF file with a pack of a certain number of copay cards or vouchers) can be sent to the physician's or pharmacy's designated email address. The digital copay cards or vouchers can be downloaded from the email account to where they were delivered, printed in the physician's or pharmacist's office, and distributed to their patients. The unique identifier for each digital copay card or voucher can enable the system and method to monitor each digital copay card or voucher and determine the distribution and redemption percentage of the digital copay cards or vouchers. This can translate to a cost and time savings because the digital copay cards or vouchers can be electronically distributed to the physicians or pharmacies, therefore, saving money on print and distribution, and delivering a paperless "green" alternative.

According to an aspect of the present disclosure, the determination of the top and bottom performing physicians or pharmacies is not limited to copay card or voucher redemption. Other factors could be used in determining the top and bottom performing physicians or pharmacies, such as, for example, a count of prescriptions written by a physician or dispensed by a pharmacy for a certain pharmaceutical drug, an indication of a physician's or pharmacy's usage of call center for instructions of a certain pharmaceutical drug, an indication of a physician's or pharmacy's usage of interactive visual aid regarding a certain pharmaceutical drug, and the like.

According to another aspect of the present disclosure, the top and bottom performing physicians or pharmacies can be determined. This can be indicative of a physician who may be under the impression that the cost of a certain pharmaceutical drug is too expensive for their patients and thus he or she may avoid prescribing that drug. The pharmaceutical sales representative can be informed of such bottom performing physicians or pharmacies to determine the root cause for the underperformance (e.g., the physician may not be aware of the existence of copay cards or vouchers, the pharmaceutical drug may not be covered by most health insurance plans, etc.). This can be useful to assist the pharmaceutical sales representative to determine and prioritize their personal visits. For example, the pharmaceutical sales representative can prioritize his or her personal visits to focus on the physicians or pharmacies with a low rate of redemption rather than those with a high rate of redemption.

In another embodiment, the system can maintain third party Commercial Payer Plan information (e.g., a private health care insurance company) related to Formulary Tiers. A Formulary Tiers is a list of drugs that the Payer will cover for patients and their associated pricing groups, which further reduces the patient's out of pocket cost with the use of the copay cards or vouchers. The copay cards or vouchers can reduce the out of pocket expense to patients differently based on their Payer Formulary Tier pricing group.

For example a Tier 3 Formulary Status may have a patient out of pocket expense of $50; with a copay card the patient will receive an additional dollar credit $30 towards the purchase of a prescription for a certain pharmaceutical drug, thus reducing the overall out of pocket expense to $20. A Tier 2 Formulary Status may have a patient out of pocket expense of $30; with a copay card the patient will receive an additional dollar credit $30 towards the purchase of a prescription for a certain pharmaceutical drug, thus reducing the overall out of pocket expense to $0.

Continuing with this example, the system can determine that the physicians that have a large population of patients within their practice that have Tier 3 Formulary Status or higher may result in having the lowest copay card redemption rate since the out of pocket expense for such patients is still $20 based on example above, while the physicians that have a large population of patients within their practice that have Tier 2 Formulary Status, have the highest redemption rate since the out of pocket expense for those patient's is $0, therefore patients are more likely to try and continue to stay on their medication since they do not have to pay any out of pocket copay, therefore this Physician practice will have a much higher redemption rate.

In this example, the system can determine which Physician practices have the greatest needs for copay cards to continue to reduce the out of pocket spend for their practice's patients based on Formulary Tier grouping for the branded drug. Based on the redemption rates of Formulary Tiers aligned to Physician practices and their associated redemptions of the copay cards, the system can instruct the pharmaceutical sales representative to prioritize his or her personal visits to the first physician to target Tier 3 and greater to focus on the patients in most need or Tier 2 where the copay cards have the greatest utilization since patient's have a $0 out of pocket spend.

Figure 1:
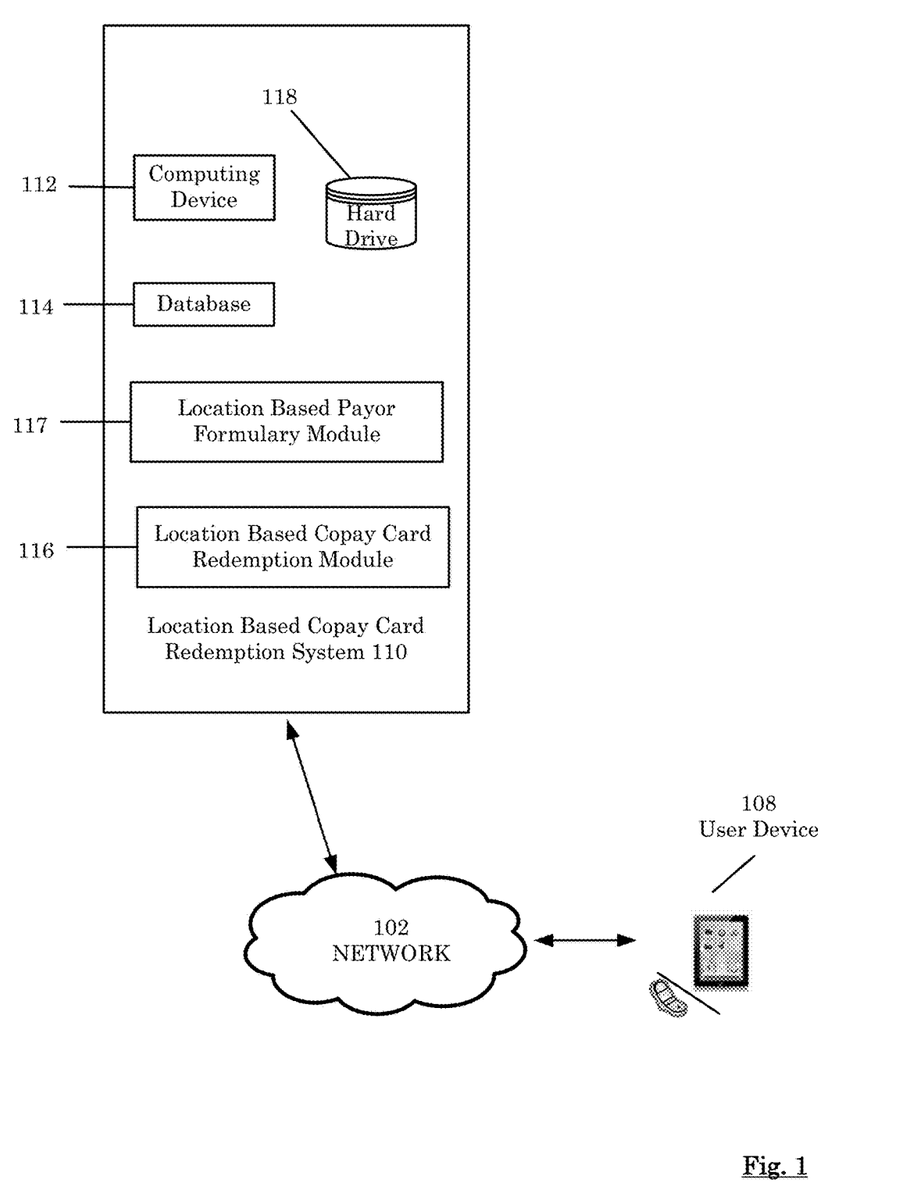
FIG. 1 is an example block diagram of systems for enabling location-based copay card or voucher redemption management in accordance with embodiments of the present invention.

FIG. 1 illustrates a block diagram of an exemplary environment including a system 110 for performing location-based copay card or voucher redemption management. The system 110 includes a computing device 112 (such as a computer, a server, a processing device, etc.) for determining, tracking, and managing a physician's or a pharmacy's copay card or voucher redemption performance in accordance with an embodiment of the present invention. The system 110 can be used to inform a user (e.g., a pharmaceutical sales representative) of the top and bottom performing or bottom performing physicians or pharmacies (e.g., those having the lowest copay card or voucher redemption activity) within the range or vicinity of a user device 108 operated by the user. As used herein, the user device 108 can be any device capable of communicating with the location-based copay card or voucher redemption management system via a network 102 (e.g., the Internet, satellite, or the wired or wireless telephone network) or via a wireless connection (e.g., a wireless local area network). The network 102 may be any type of communications medium that allows for communication between the system 110 and the user device 108. The user device 108 can include, but is not limited to, a tablet device such as the Apple® iPad, a computer, a smart phone, a wireless device, and/or any suitable computing device.

In an embodiment, the system 110 may include a location based copay card redemption module 116 for providing processing logic or computer instructions for location-based copay card or voucher redemption management for notifying a user of the bottom performing physicians and/or pharmacies within a certain range of the user device 108. As used herein, the location based copay card redemption module 116 may be a computer program or processing logic including one or more sets of instructions provided to implement method 200, as described below in connection with FIG. 2.

In an embodiment, the location based copay card redemption module 116 may be implemented by a computing device 112 for providing a system and method for location-based copay card or voucher redemption management. As used herein, the term "computing device" is intended to include a programmable electronic machine or a processing device that performs and/or executes software to perform several operations such as assemble, store, correlate, or otherwise process information. The location based copay card redemption module 116 can include processing logic for receiving the GPS coordinates of the user device 108 and comparing it to the addresses of the physicians or pharmacies that are considered to have a top and bottom copay card or voucher redemption performance. A bottom copay card or voucher redemption performer may be a physician or pharmacy with the lowest number of redeemed copay cards or vouchers within a certain region.

The system 110 may include a location based payor formulary module 117 for providing processing logic or computer instructions for location-based payor formulary management for maintaining a list of pharmaceutical drugs that a private insurance company will pay for. As used herein, the location based payor formulary module 117 may be a computer program or processing logic including one or more sets of instructions provided to implement method 200, as described below in connection with FIG. 2. The location based payor formulary module 117 may be implemented by a computing device 112 to maintain and manage the data with respect to the Formulary Tiers as discussed above.

The system 110 may also include a database 114. As used herein, the term "database" refers to a repository for containing and storing data. The data that is stored in database 114 may be related to the copay card or voucher redemption performance data. The data can also include one or more addresses of the physician or pharmacy, and the GPS coordinates of such addresses.

The system 110 may also include a hard drive 118 for storing the database 114 and a wireless device and/or an Internet interface (not shown) that allows for communication with any type of consumer device. The system 110 is configured to communicatively connect to one or more user devices 108 via the network 102 (e.g., the Internet, or the wired or wireless telephone network).

Figure 2:
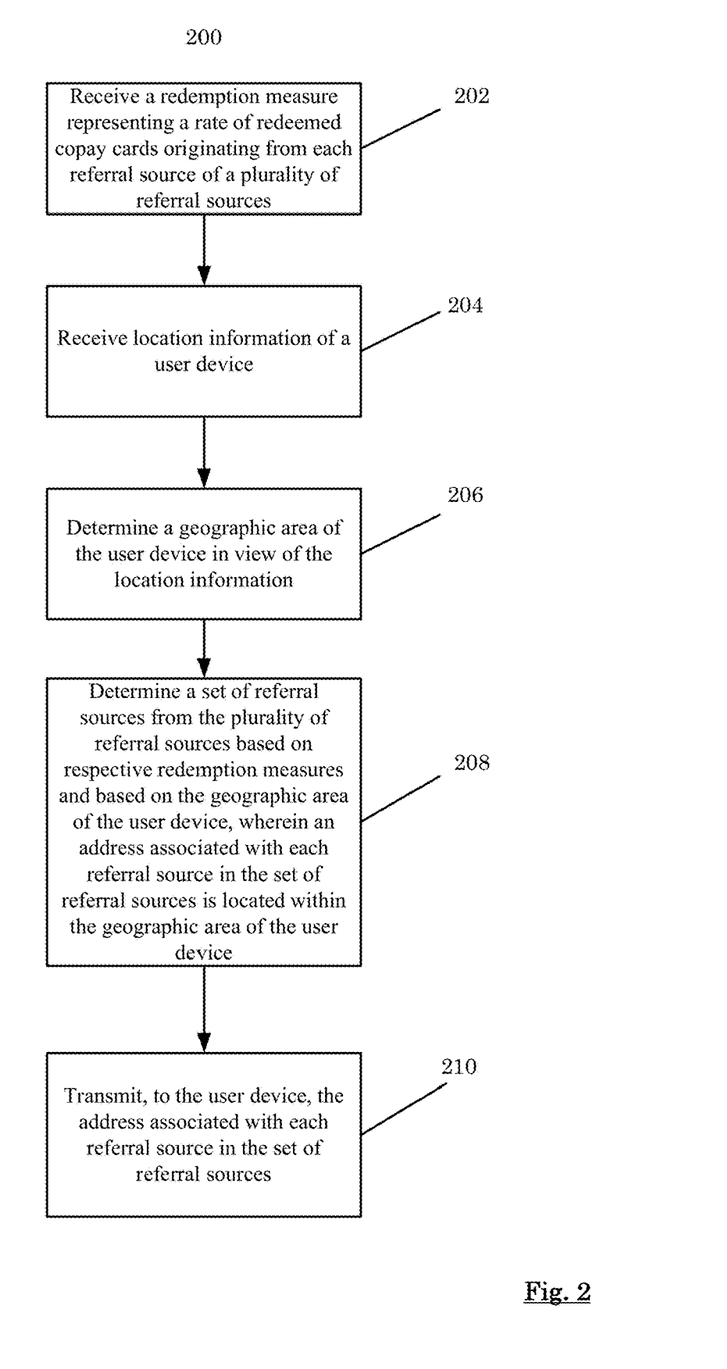
FIG. 2 is a flow diagram of an example method for enabling location-based copay card or voucher redemption management in accordance with embodiments of the present invention.

FIG. 2 illustrates an exemplary method 200 for providing location-based copay card or voucher redemption management. In an embodiment, a system (e.g., system 110 including the location based copay card redemption module 116, and the location based payor formulary module 117 as shown in FIG. 1) is provided to implement method 200. In block 202, the system 110 can receive a redemption measure representing a rate of redeemed copay cards originating from each referral source of a plurality of referral sources. As used herein, the referral source can be a name and address of the physician who wrote the prescription or the name and address of the pharmacy where the copay card or voucher was redeemed (or the like) and the distribution source marketing channel where the copay card or voucher was received by the consumer or a patient. It is noted that the term "patient" is used herein to refer to a person receiving a health care service from a physician, and a "consumer" is used herein to refer to a person who purchases a pharmaceutical drug. The redemption measure may be, for example, a count of the number of redemptions month-to-date, biweekly, quarter-to-date, program-to-date, a cumulative total, or the like. The redemption measure may also be, for example, a ratio of the number of redemptions to the number of distributions that originated from a specific physician.

The system 110 can associate each referral source with at least one address. For example, a physician may have more than one office at more than one address. The system 110 can associate the physician with multiple addresses and store the association in the database 114. In an embodiment, the system 110 can associate the redemption count of the physician or pharmacy with the respective address or addresses of the physician or pharmacy and store this data in the database 114. In an embodiment, the system 110 can translate the stored addresses into a global positioning system (GPS) coordinate and store the information in the database 114. In an embodiment, the system 110 can deliver or provide the information that is stored in the database 114 to the user device 108.

In block 204, the system 110 can receive location information of the user device 108. In block 206, the system 110 can determine a geographic area of the user device 108 in view of the location information. The location information of the user device 108 can be received by the system 110 from a GPS system that can track and monitor the global positioning of the user device 108. In an example, the geographic area can be a region having a certain radius (e.g., 1 mile, 5 miles, etc.) from the current geographic location of the user device 108. In another embodiment, the geographic area can be a predetermined boundary area, for example, a zip code or a municipality, the town, county, borough, etc., corresponding to the current location of the user device 108.

In block 208, the system 110 can determine a set of referral sources from the plurality of referral sources based on respective redemption measures and based on the geographic area of the user device, wherein an address associated with each referral source in the set of referral sources is located within the geographic area of the user device. For example, the system 110 can determine a set of bottom performing referral sources from the plurality of referral sources tracked and stored in the database 114 based on the received redemption counts, wherein the address of each referral source in the set of bottom performing referral sources is located within the geographic area of the user device 108.

The bottom performing referral sources can be, for example, the physicians with the lowest copay card or voucher redemption rates. The system 110 can delineate the bottom performing referral sources as, for example, the bottom 10 (or 20 etc.) physicians with the lowest copay card or voucher redemption rates within the specified geographical area. Similarly, the system 110 can determine the bottom 10 (or 20 etc.) pharmacies with the lowest copay card or voucher redemption rates within the specified geographical area. In another embodiment, the bottom performing physicians or pharmacies may be determined based on a variety of factors, such as, for example, the lowest redemption count within a specified period (e.g., month-to-date, biweekly, quarter-to-date, year-to-date), the lowest cumulative total, the lowest increase since the previous time period, the lowest percentage redemption rate (which can be obtained by dividing the copay redemption count by the total number of copay cards or vouchers issued to the physician or pharmacy), or by the physician or pharmacy having the highest number of remaining copay cards or vouchers in hand (which can be obtained by subtracting the copay redemption count from the total number of copay cards or vouchers issued to the physician or pharmacy). One of ordinary skill will recognize that the formulas to determine the lowest redemption counts are not limited to the examples set forth above.

In block 210, the system 110 can transmit, to the user device 108, the address associated with each referral source in the set of referral sources. The system 110 can provide the source information which includes addresses, copay card or voucher redemption count, etc., associated with each referral source in the set of bottom performing referral sources to the user device 108. In an example, the user device 108 may display a map of the bottom referral sources within a certain vicinity of the location of the user device 108. In an embodiment, the user device 108 can toggle the display to show either the all of the referral sources in the geographical area or only the bottom performing referral sources in the geographical area.

Figure 3:
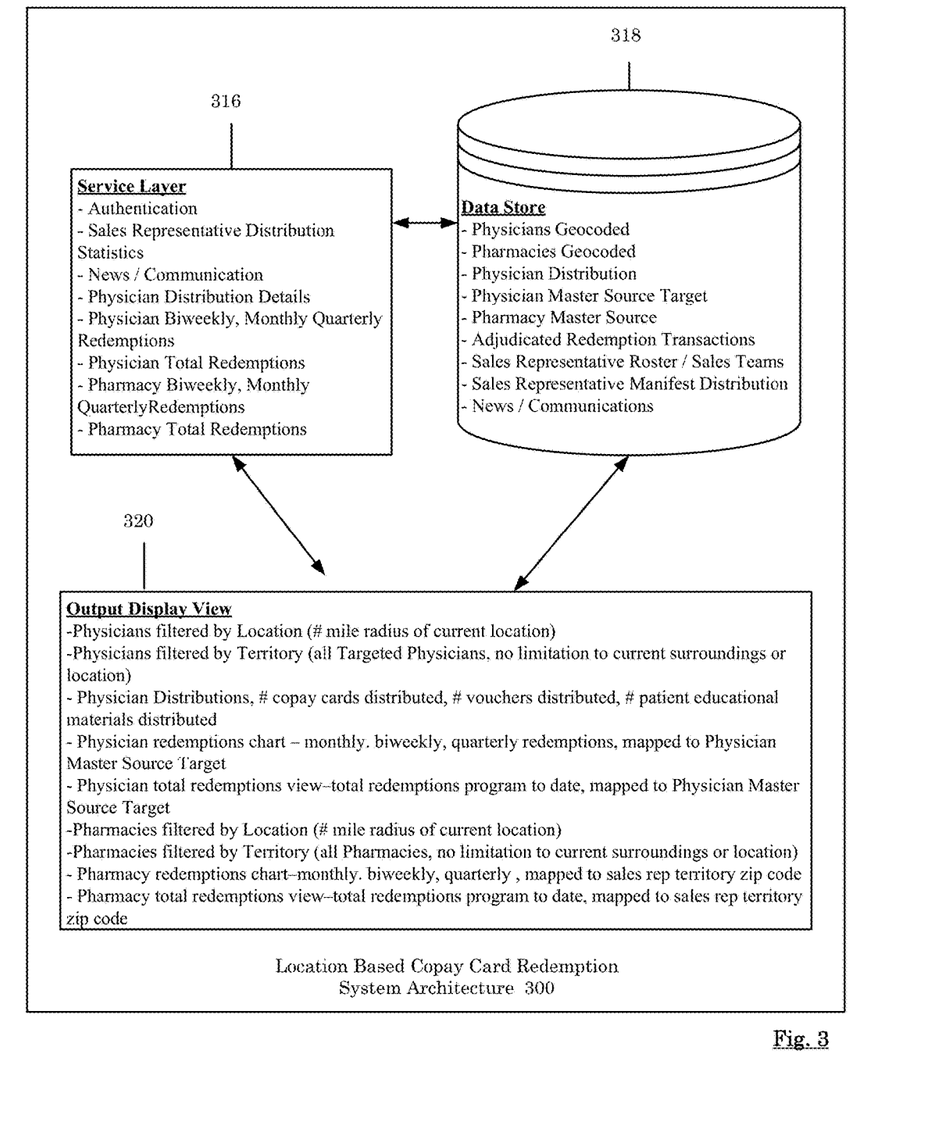
FIG. 3 is a flow diagram of an example method for enabling location-based copay card or voucher redemption management in accordance with embodiments of the present invention.

FIG. 3 is an example of a system architecture 300 for enabling location-based copay card or voucher redemption management in accordance with embodiments of the present invention. The system architecture 300 illustrates different embodiments of the tracking of the copay card or voucher redemption count for the health care professional (HCP).

The system architecture 300 includes a service layer 316, a data store 318, and an output display view 320.

The service layer 316 of the system architecture 300 can authenticate a user with a username and password methodology or authenticate a user without user input by a unique identifier (such as a serial number) that is associated with the user device. The service layer 316 can also perform functions such as calculating sales representative distribution statistics such as how many copay cards or vouchers were distributed to certain physicians by a certain salesperson, when they were distributed, and other physician distribution and redemption details on the basis of different time periods, such as biweekly, monthly, quarterly, or year-to-date. The service layer 316 can also determine pharmacy redemption information such as the total redemptions by a certain pharmacy on the basis of different time periods, such as biweekly, monthly, quarterly, or year-to-date. The service layer 316 can also coordinate news and communications between the sales representatives and the sales team leaders such as generating and maintaining a periodic or weekly call cycle which directs the sales representative to certain physicians based on the copay card or voucher redemption measures.

The data store 318 of the system architecture 300 can maintain information such as the geocoded locations of the physicians and pharmacies and a master source of the physicians and pharmacies. The data store 318 can also maintain information with respect to the copay cards or vouchers that were distributed to certain physicians, the copay cards or vouchers that were redeemed by certain pharmacies. The data store 318 can also maintain information associated with the sales representatives such as the roster of sales representatives and the sales teams, and their respective manifests. The data store 318 can also maintain information related news and communications between the sales representatives and the sales team leaders.

The output display view 320 of the system architecture 300 can organize and present relevant data and information to the sales representative. The output display view 320 can present a view of copay cards or vouchers distributed and redeemed with respect to a specific sales representative. The output display view 320 can also display the physician redemption totals based on a target alignment. The output display view 320 can also display information about a certain physician such as the number of copay cards or vouchers distributed, the order date, the distribution channels, the distribution status, the total monthly redemptions, the total redemptions to date, which can be mapped to a sales representative territory or to a zip code. The output display view 320 can also display information about a certain pharmacy such as the monthly redemptions and total redemptions to date, which can be mapped to sales representative territory or to a zip code.

In an embodiment, the data from the pharmacy can be treated separately from the data from the HCP or physician. Such data can include copay card or voucher redemptions by a time period (e.g., monthly redemptions). The data for the respective pharmacy or HCP can be mapped to a geographic area such as a zip code or target file alignment which corresponds to a territory of a sales representative. This can enable a sales representative to view the copay card or voucher redemption activities of the HCP's or pharmacies in his or her sales territory.

In another embodiment, the user device 108 can have a unique identifier that can be mapped to a certain geographical sales region or sales territory. The unique identifier may be used to determine the data stored in the database 114 which is relevant to a certain user device 108, based on the GPS coordinates of the physician's or pharmacy's address and the geographical region that is mapped to the user device 108. For example, if the user device 108 is mapped to a certain region or territory, the system 110 can provide only the data for the physicians or pharmacies that have addresses within that certain region or territory.

Figure 4:
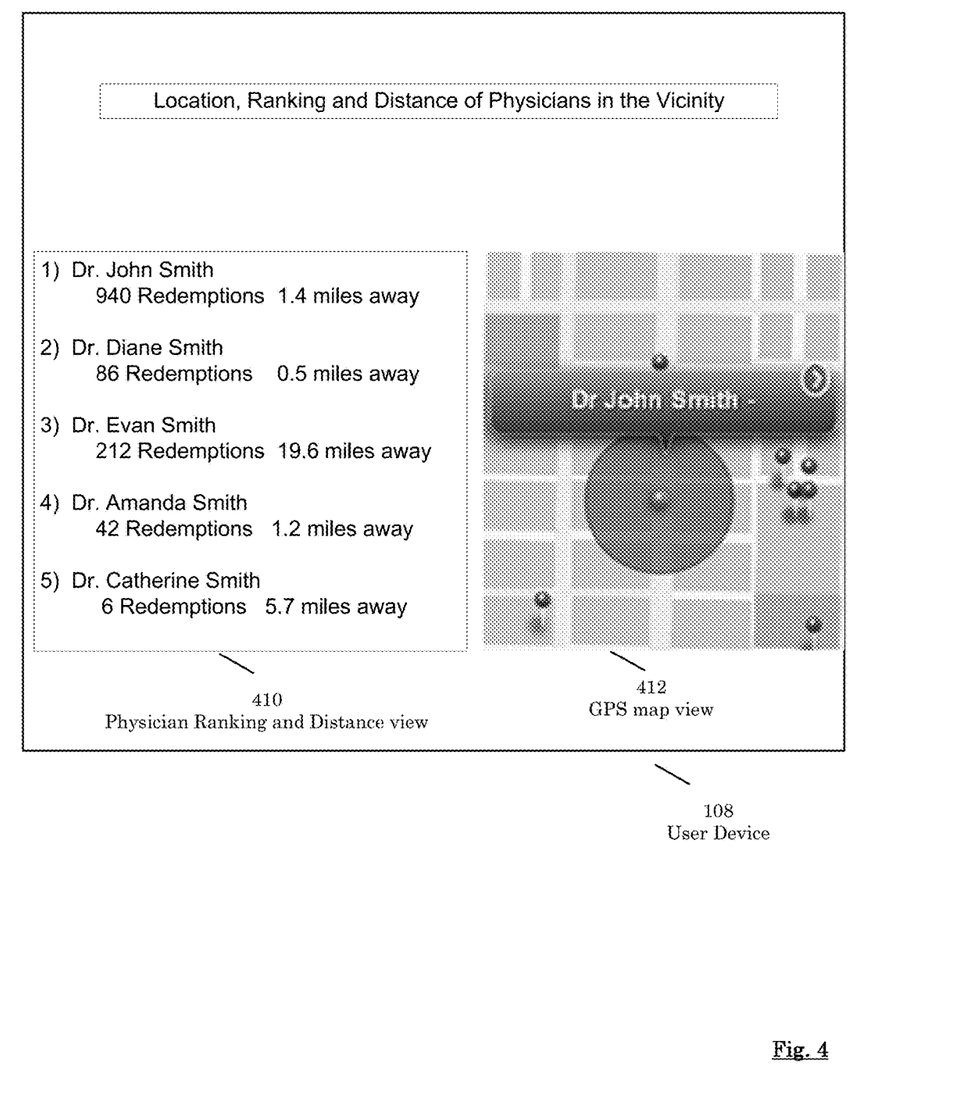
FIG. 4 is an example display for enabling location-based copay card or voucher redemption management in accordance with embodiments of the present invention.

FIG. 4 is an example display of a user device 108 for enabling location-based copay card or voucher redemption management in accordance with embodiments of the present invention. The display of the user device 108 shows a geographic map that can use a GPS system to indicate the current location of the user device 108 and the location of the bottom performing referral sources (in this example, the bottom performing physicians) within a certain radius or vicinity of the user device 108. In an embodiment, the user device 108 can display the names, addresses, and telephone number of each of the bottom performing physicians, and can pinpoint the location of each of the bottom performing physicians on the map.

In an embodiment, the user device 108 can present the location, ranking, and distance of physicians in the vicinity of the user device 108. The display can include a physician ranking and distance view 410 and a GPS map view 412.

The physician ranking and distance view 410 can display a rank order of physicians for the sales representative to visit based on the location of the user device 108 and also based on the number of copay card or voucher redemptions associated with the physician. In this example, the system 110 can direct the sales representative to visit the physicians based on having a high number of redemptions and also based on the distance of the address of the physician to the user device 108. The distance of the physician to the user device 108 can be determined in terms of physical distance or in terms of an estimated time to arrive to the address of the physician based on current traffic conditions.

In this example, even though Dr. Diane Smith is nearest to the user device 108, Dr. John Smith is considered to be the top priority because of the high number of redemptions for Dr. John Smith as compared to Dr. Diane Smith. Conversely, Dr. Diane Smith is considered to be a higher priority as compared to Dr. Evan Smith because of her proximity to the user device, even though Dr. Evan Smith has a greater number of redemptions than Dr. Diane Smith. In an embodiment, the system 110 can display a corresponding GPS map view 412 to assist and orient the sales representative and to provide directions to the location of the physician.

Figure 5A:
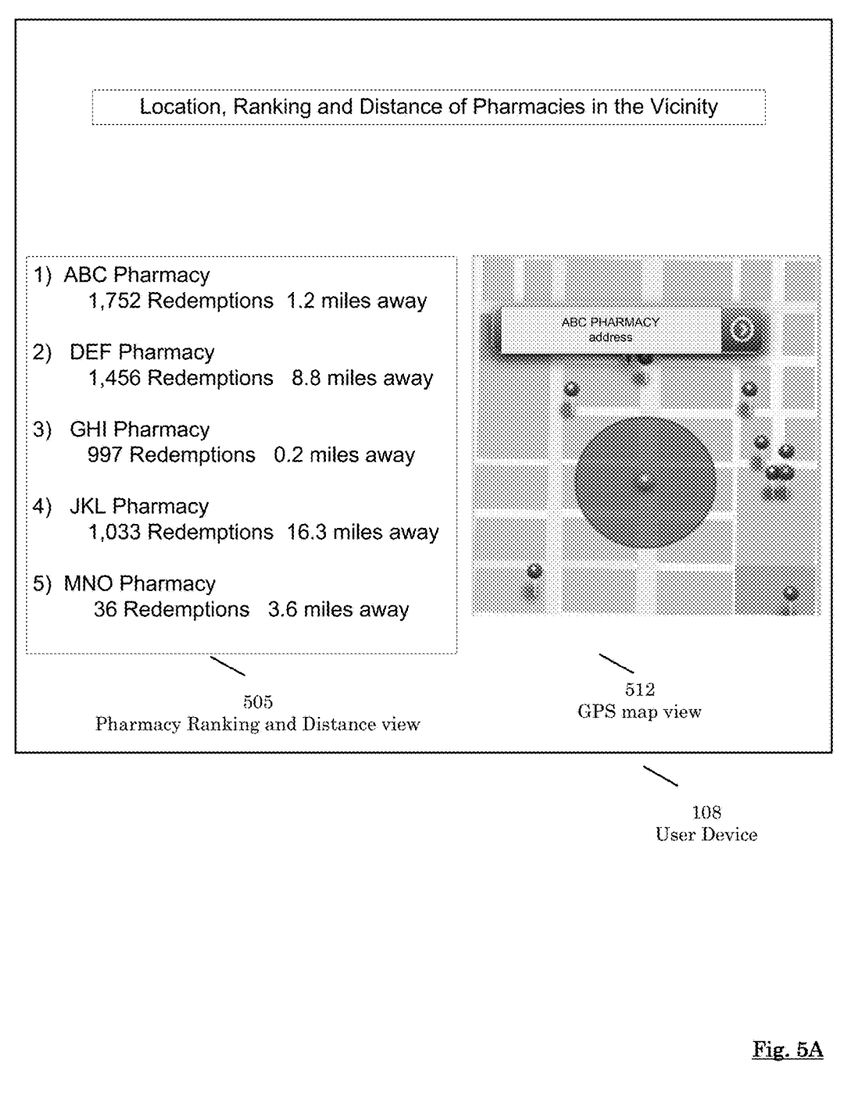
FIG. 5A is an example display for enabling location-based copay card or voucher redemption management in accordance with embodiments of the present invention.

FIG. 5A is an example display a user device 108 for enabling location-based copay card or voucher redemption management in accordance with embodiments of the present invention. The display of the user device 108 can present the location, ranking, and distance of pharmacies in the vicinity of the user device 108. The display can include a pharmacy ranking and distance view 505 and a GPS map view 512.

Similar to the physician ranking and distance view 410 as discussed above, the pharmacy ranking and distance view 505 can display a rank order of pharmacies for the sales representative to visit based on the location of the user device 108 and also based on the number of copay card or voucher redemptions associated with the pharmacies. In this example, the system 110 can direct the sales representative to visit the pharmacies based on having a high number of redemptions and also based on the distance of the address of the pharmacy to the user device 108. The distance of the pharmacy to the user device 108 can be determined in terms of physical distance or in terms of an estimated time to arrive to the address of the physician based on current traffic conditions.

In this example, even though the GHI pharmacy has fewer redemptions than the JKL pharmacy, the system 110 can prioritize the GHI pharmacy ahead of the JKL pharmacy due to its proximity to the user device 108. In an embodiment, the system 110 can display a corresponding GPS map view 512 to assist and orient the sales representative and to provide directions to the location of the pharmacy.

Figure 5B:
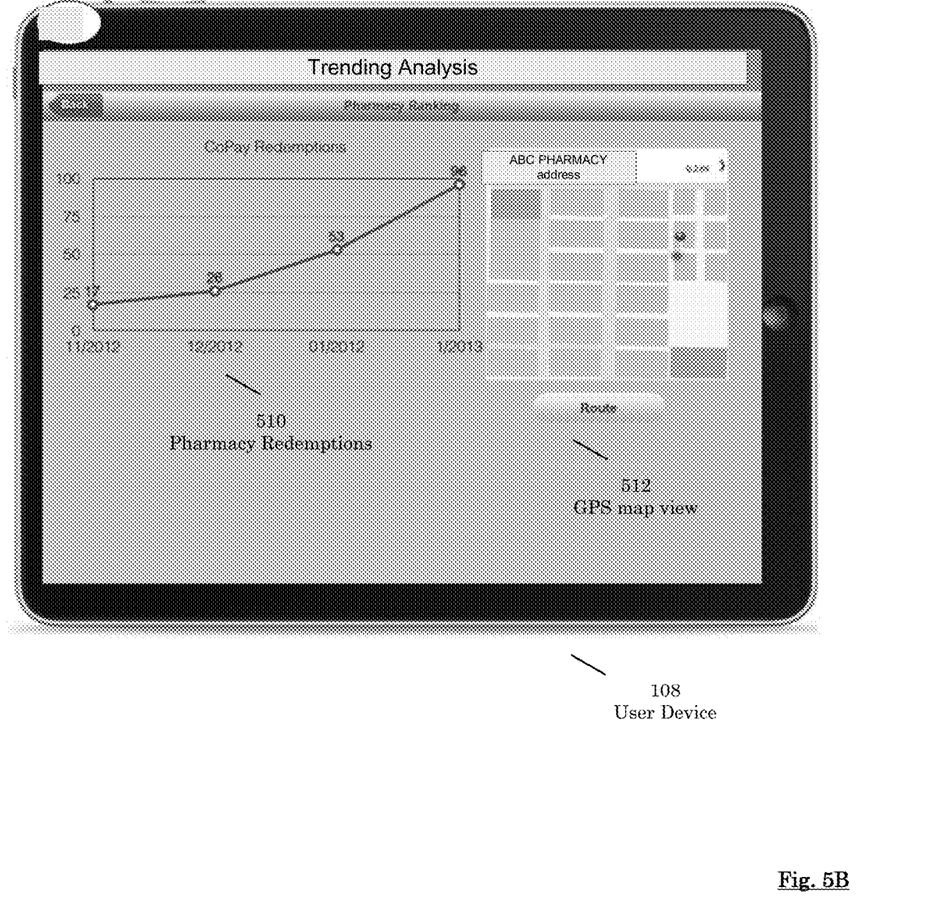
FIG. 5B is an example display for enabling location-based copay card or voucher redemption management in accordance with embodiments of the present invention.

FIG. 5B is an example display a user device 108 for enabling location-based copay card or voucher redemption management in accordance with embodiments of the present invention. The display of the user device 108 shows a GPS map view 512 that can use a GPS system to indicate the current location of a certain referral sources (in this example, a bottom performing pharmacy) within a certain radius or vicinity of the user device 108. In an embodiment, the user device 108 can display the name, address and telephone number of a certain pharmacy, can pinpoint the location of the pharmacy on the map. In an embodiment, the user device 108 can also display a pharmacy redemptions 510 chart which illustrates the trending data of a certain pharmacy, in this case, the monthly copay card or voucher redemption counts. In an embodiment, the user device 108 can display a route from the present location of the user device 108 to the bottom performing pharmacy.

Figure 6:
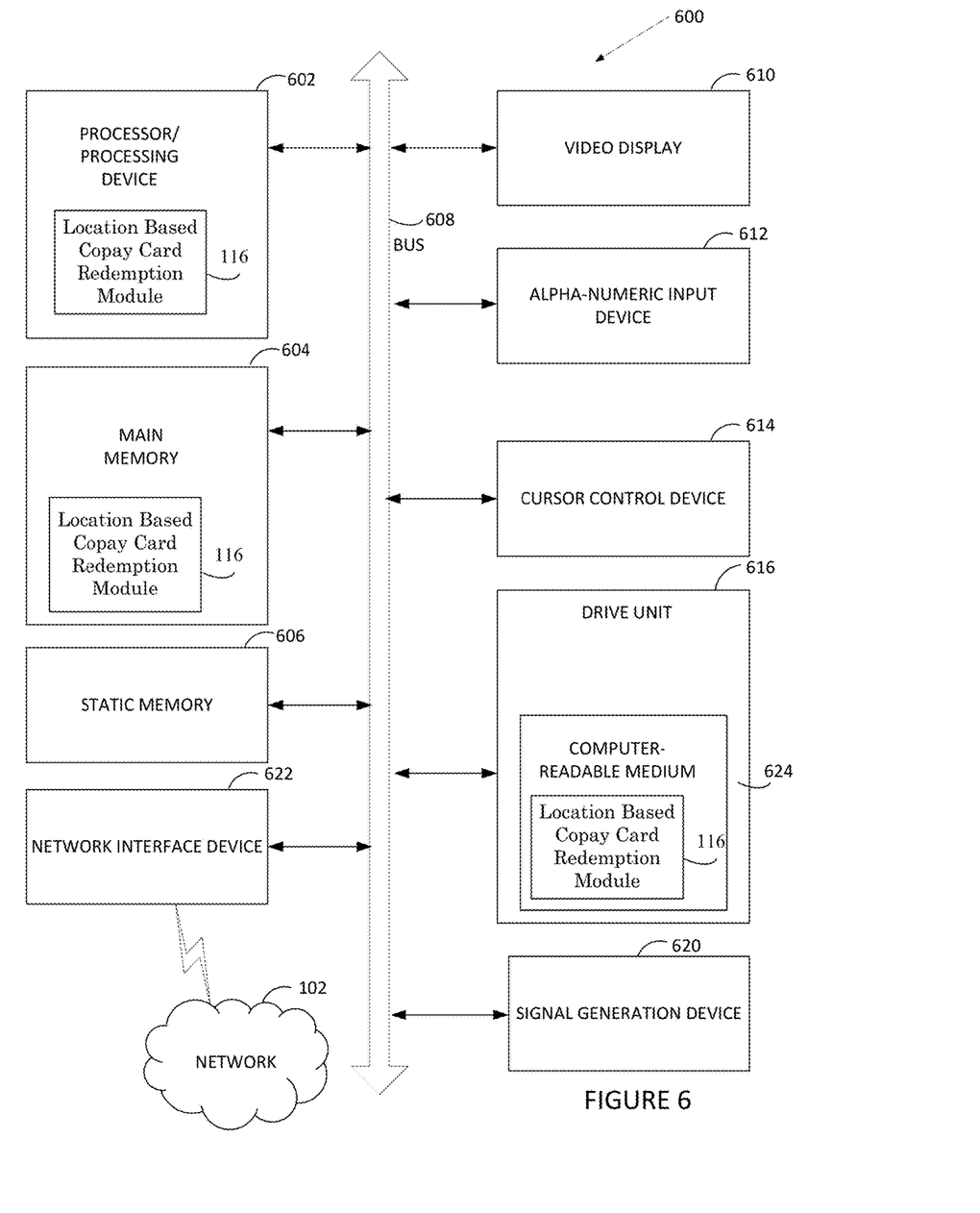
FIG. 6 is a block diagram of an exemplary computer system that may perform one or more of the operations described herein for enabling location-based copay card or voucher redemption management.

FIG. 6 illustrates a diagrammatic representation of a machine in the form of a computer system for location-based copay card or voucher redemption management, in accordance with one example of the present disclosure. The computing system may include a set of instructions 116, for causing the machine to perform any one or more of the methodologies discussed herein. In alternative examples, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines (e.g., computers) that individually or jointly execute a set (or multiple sets) of instructions to perform any one or more of the methodologies discussed herein.

The computer system 600 includes a processing device 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory 616 (e.g., a data storage device), which communicate with each other via a bus 608.

The processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute the operations for location-based copay card or voucher redemption management for performing steps discussed herein.

The computer system 600 may further include a network interface device 622. The network interface device may be in communication with a network 102. The computer system 600 also may include a video display unit 610 (e.g., a liquid crystal display (LCD), a touch screen, or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a computer-readable storage medium (or more specifically a non-transitory computer-readable storage medium) 624 on which is stored one or more sets of instructions 116 (e.g., instructions executed by the location based copay card redemption module 116 and the location based payor formulary module 117) for the computer system 600 representing any one or more of the methodologies or functions described herein. The instructions executed by module 116 for the computer system 600 may also reside, completely or at least partially, within the main memory 604 and/or within the processing device 602 during execution thereof by the computer system 600, the main memory 604 and the processing device 602 also constituting computer-readable storage media. The module 116 for the computer system 600 may further be transmitted or received over a network via the network interface device 622.

While the computer-readable storage medium 624 is shown in an example to be a single medium, the term "computer-readable storage medium" should be taken to include a single medium or multiple media (e.g., a centralized or distributed database, and/or associated caches and servers) that store the one or more sets of module 116. The term "computer-readable storage medium" shall also be taken to include any medium that is capable of storing or encoding a set of instructions for execution by the machine that cause the machine to perform any one or more of the methodologies of the disclosure. The term "non-transitory computer-readable storage medium" shall accordingly be taken to include, but not be limited to, solid-state memories, and optical and magnetic media.

Some portions of the detailed descriptions above are presented in terms of symbolic representations of operations on data bits within a computer memory. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," and "transmitting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The descriptions and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. Although the disclosure has been described with reference to specific examples, it will be recognized that the disclosure is not limited to the examples described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method to provide to a plurality of users, each having an associated user device connected to a network, a ranked listing of a plurality of referral sources that issue one or more of a plurality of copay cards to a plurality of consumers, each card is uniquely identified and is redeemable by a plurality of redeemers, the user device is configured to receive its geographic location from a global positioning system, the method comprising steps of:

on a processor connected to the network:
receiving, from each of the plurality of redeemers, a rate of redeemed copay cards and data identifying these of the pluralities of referral sources and redeemers associated with the redeemed copay card;
setting a geographic area of the user device in view of the geographic location of the user device;
ranking the plurality of referral sources and the plurality of redeemers, respectively, within the geographic area based on the rate and distance of said respective referral sources from the user device; and
producing the ranked listing of the ranked plurality of referral sources and the ranked plurality of redeemers within the geographic area and their distance from the user device, wherein the ranked listing is automatically updated in real-time in response to changes of the geographic location.

2. The method of claim 1, wherein each geographic area includes
   a first and a last of the plurality of referral sources which have prescribed most and least of the plurality of copay cards, respectively, and
   a first and a last of the plurality of redeemers which have redeemed most and least of the plurality of copay cards, respectively.

3. The method of claim 2, wherein the ranked listing includes a ranked order of the plurality of referral sources having the first and last referral sources located within the geographic area of the user device and the plurality of redeemers having the first and last redeemers located within the geographic area of the user device.

4. The method of claim 1, wherein each copay card comprises a unique group identifier indicating a plurality of marketing channels in which the copay card had been distributed and further comprising steps of:
   receiving a distribution measure representing an amount of copay cards distributed to each marketing channel; and
   determining, for each of the plurality of referral sources, the rate based on a ratio of the rate and the distribution measure.

5. The method of claim 1, wherein the geographic area comprises a radial distance from the geographic location of the user device.

6. The method of claim 5, wherein the step of ranking of the plurality of referral sources is based any one of: the rate of redemption count within a specified period, copay card redemption cumulative total, the rate of redemption increase since a previous time period, percentage of the redemption rate, and a number of not-redeemed copay cards.

7. The method of claim 1, wherein the rate represents a number of copay cards that have been redeemed within an identified time period.

8. The method of claim 7, wherein the identified time period is one of a week, a month, a quarter year, a half year, a year, and to date.

9. The method of claim 1, wherein the step of ranking of the plurality of referral sources is based on at least one of: an indication of usage of a call center for instructions related to the copay cards, and an indication of usage of interactive visual aid regarding the copay cards.

10. A system to provide to a plurality of users, each having an associated user device connected to a network, a ranked listing of a plurality of referral sources that issue one or more of a plurality of copay cards a plurality of consumers, each card is uniquely identified and is redeemable by a plurality of redeemers, the user device is configured to receive its geographic location from a global positioning system, the system comprising:
   a processing device configured to:
   receive, from each of the plurality of redeemers, a rate of redeemed copay cards and identities of the pluralities of referral sources and redeemers associated with the redeemed copay card
   set a geographic area of the user device in view of the geographic location of the user device;
   rank the plurality of referral sources and the plurality of redeemers, respectively, within the geographic area based on the rate and distance of said respective referral sources from the user device; and
   produce the ranked listing of the ranked plurality of referral sources and the ranked plurality of redeemers within the geographic area and their distance from the user device, wherein the ranked listing is automatically updated in real-time in response to changes of the geographic location.

11. The system of claim 10, wherein each geographic area includes
   a first and a last of the plurality of referral sources which have prescribed most and least of the plurality of copay cards, respectively, and
   a first and a last of the plurality of redeemers which have redeemed most and least of the plurality of copay cards, respectively.

12. The system of claim 11, wherein the ranked listing includes a ranked order of the plurality of referral sources having the first and last referral sources located within the geographic area of the user device and the plurality of redeemers having the first and last redeemers located within the geographic area of the user device.

13. The system of claim 10, wherein each copay card comprises a unique group identifier indicating a plurality of marketing channels in which the copay card had been distributed and the processing device is further configured to:
   receive a distribution measure representing an amount of copay cards distributed to each marketing channel; and
   determine, for each of the plurality of referral sources, the rate based on a ratio of the rate and the distribution measure.

14. The system of claim 10, wherein the geographic area comprises a radial distance from the geographic location of the user device.

15. The system of claim 10, wherein the rate represents a number of copay cards that have been redeemed within an identified time period.

16. The system of claim 15, wherein the identified time period is one of a week, a month, a quarter year, a half year, a year, and to date.

17. A non-transitory computer-readable storage medium including instructions that, when executed by a processing device, cause the processing device to perform a method to provide to a plurality of users, each having an associated user device connected to a network, a ranked listing of a plurality of referral sources that issue one or more of a plurality of copay cards to a plurality of consumers, each card is uniquely identified and is redeemable by a plurality of redeemers, the user device is configured to receive its geographic location from a global positioning system, the method comprising steps of:
   on a processor connected to the network:
   receiving, from each of the plurality of redeemers, a rate of redeemed copay cards and identities of the pluralities of referral sources and redeemers associated with the redeemed copay card;
   setting a geographic area of the user device in view of the geographic location of the user device;
   ranking the plurality of referral sources and the plurality of redeemers, respectively, within the geographic area based on the rate and distance of said respective referral sources from the user device; and
   producing the ranked listing of the ranked plurality of referral sources and the ranked plurality of redeemers within the geographic area and their distance from the user device, wherein the ranked listing is automatically updated in real-time in response to changes of the geographic location.

18. The non-transitory computer-readable storage medium of claim 17, wherein each geographic area includes
- a first and a last of the plurality of referral sources which have prescribed most and least of the plurality of copay cards, respectively, and
- a first and a last of the plurality of redeemers which have redeemed most and least of the plurality of copay cards, respectively.

19. The non-transitory computer-readable storage medium of claim 18, wherein the ranked listing includes a ranked order of the plurality of referral sources having the first and last referral sources located within the geographic area of the user device and the plurality of redeemers having the first and last redeemers located within the geographic area of the user device.

20. The non-transitory computer-readable storage medium of claim 17, wherein each copay card comprises a unique group identifier indicating a plurality of marketing channels in which the copay card had been distributed and further comprising steps of:
- receiving a distribution measure representing an amount of copay cards distributed to each marketing channel; and
- determining, for each of the plurality of referral sources, the rate based on a ratio of the rate and the distribution measure.

21. The non-transitory computer-readable storage medium of claim 17, wherein the geographic area comprises a radial distance from the geographic location of the user device.

22. The non-transitory computer-readable storage medium of claim 17, wherein the rate represents a number of copay cards that have been redeemed within an identified time period.

* * * * *